(12) United States Patent
Nishida et al.

(10) Patent No.: US 6,312,802 B1
(45) Date of Patent: Nov. 6, 2001

(54) POLYMERS FOR IMPARTING LIGHT RESISTANCE TO FIBERS, HIGHLY LIGHT-RESISTANT FIBERS, AND PROCESS FOR PRODUCING THE FIBERS

(75) Inventors: Toshifumi Nishida, Suita; Nobuhisa Noda, Hashima; Takahiro Aoyama, Hyogo, all of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/612,213

(22) Filed: Jul. 7, 2000

(30) Foreign Application Priority Data

Jul. 9, 1999 (JP) .................................................. 11-196567

(51) Int. Cl.[7] ........................ C08F 220/10; C08F 226/06; D01F 6/00; B32B 27/02
(52) U.S. Cl. .......................... 428/357; 428/364; 428/394
(58) Field of Search .................................. 525/219, 220; 528/327; 526/265, 308, 309, 313, 316; 428/357, 364, 394

(56) References Cited

U.S. PATENT DOCUMENTS

| | | | |
|---|---|---|---|
| 3,684,765 | * | 8/1972 | Matsui et al. ........................ 524/103 |
| 5,239,028 | * | 8/1993 | Nakagawa et al. ................... 526/265 |
| 5,264,526 | | 11/1993 | Kashiwai et al. ..................... 525/219 |
| 5,458,924 | * | 10/1995 | Kashiwai et al. .................. 427/389.9 |
| 5,618,909 | * | 4/1997 | Lofquist et al. ...................... 528/310 |

FOREIGN PATENT DOCUMENTS

| | | |
|---|---|---|
| 0337744 | 10/1989 | (EP) . |
| 0508744 | 10/1992 | (EP) . |
| 1013709 | 6/2000 | (EP) . |
| 4-153316 | 5/1992 | (JP) . |

OTHER PUBLICATIONS

Patent Abstracts of Japan, vol. 1997, No. 05 May 30, 1997 & JP 09 003133 A (Nippon Shokubai Co Ltd), Jan. 7, 1997.

* cited by examiner

Primary Examiner—P. Hampton-Hightower
(74) Attorney, Agent, or Firm—Wenderoth, Lind & Ponack, L.L.P.

(57) ABSTRACT

A polymer for imparting light resistance to fibers is prepared by radical polymerizing a monomer composition including a specific ultraviolet stabilizable monomer and/or ultraviolet absorptive monomer. A highly light resistant fiber includes the light resistance imparting polymer inside or on the surface of the fiber. The polymer can impart a satisfactory light resistance to fibers over a long time, and the fiber is highly resistant to light.

12 Claims, No Drawings

POLYMERS FOR IMPARTING LIGHT RESISTANCE TO FIBERS, HIGHLY LIGHT-RESISTANT FIBERS, AND PROCESS FOR PRODUCING THE FIBERS

BACKGROUND OF THE INVENTION

1. Field of the Invention

The present invention relates to a polymer for imparting high light resistance and weather resistance (hereinafter simply referred to as "light resistance") to fibers. The invention further relates to a highly light resistant fiber containing the polymer, to a highly light resistant fiber having a layer containing the polymer on its surface, and to a process for the production of the fibers.

2. Description of the Related Art

Polyurethane fibers are characterized by high elasticity and are widely used in numerous applications such as stockings, undergarments, as well as swimsuits, ski suits, and other sportswear, and elastic bandages, artificial vessels, and other medical articles. However, such polyurethane fibers are poor in light resistance. Specifically, by action of ultraviolet rays in sunlight or light from fluorescent lamps, the molecules of polyurethane fibers are photolyzed, and the strength and other properties of the fibers are deteriorated or dyed fibers are discolored.

Separately, polyester fibers are highly strong and highly elastic, are satisfactorily resistant to heat and chemicals, and are in wide use for clothing materials and industrial materials. The polyester fibers are more resistant to light and are therefore more resistant to light-induced deterioration and discoloring than polyurethane fibers and polyamide fibers. Demands on the use of such polyester fibers for interior members of cars and other materials have been increased, as such materials are often exposed to sunlight. However, higher light resistance is required as high grade cars are demanded. Improvements in light resistance of other fibers have been also demanded.

To improve light resistance, light resistance improving agents such as ultraviolet absorbents and antioxidants which are low molecular weight compounds are conventionally added to fibers (e.g., Japanese Unexamined Patent Application Publication No. 4-153316). Such light resistance improving agents are added to fibers by a process which comprises the step of coating surfaces of fibers with the light resistance improving agents after the formation of fibers (surface treatment process), or by a process which comprises the steps of adding the light resistance improving agents to a spinning material prior to a spinning process, and forming fibers from the resulting mixture (material adding process). However, according to the surface treatment process, the light resistance improving agents is readily peeled off from the fiber and a long-term improvement effect on light resistance cannot be significantly expected. In addition, the feeling of the resulting fibers is changed and high quality products cannot be obtained. In contrast, the material adding process is disadvantageous in that in wet spinning, for example, the light resistance improving agents is dissolved out into a coagulation bath, and only a portion of the added light resistance improving agents remains in the fiber. In addition, such a low molecular weight light resistance improving agents bleeds out on the surface of the fiber and, ultimately, is peeled out from the fiber, and the appearance of the fiber is deteriorated with time.

SUMMARY OF THE INVENTION

Accordingly, an object of the invention is to provide a polymer which is capable of imparting a high light resistance to fibers over a long time, and to provide a highly light resistant fiber.

Specifically, the invention provides, in an aspect, a polymer for imparting light resistance to fibers (hereinafter referred to as "light resistance imparting polymer"). The polymer is obtained by radical polymerizing a monomer composition including an ultraviolet stabilizable monomer of the following formula (1) or (2):

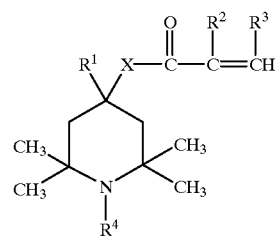

(1)

wherin $R^1$ is a hydrogen atom or a cyano group, each of $R^2$ and $R^3$ is independtly a hydrogen atom or a methyl group, $R^4$ is a hydrogen atom or a hydrocarbon group, and X is an oxygen atom or an imino goup.

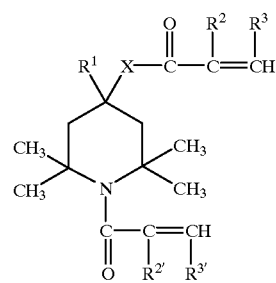

(2)

wherin $R^1$ is a hydrogen atom or a cyano group, each of $R^2$, $R^3$, $R^{2'}$, and $R^{3'}$ is independently a hydrogen atom or a methyl group, and X is an oxeygen atom or an imino group.

In another aspect, invention provides a polymer for imparting light resistance to fibers. This polymer is obtained by radical polymerizing a monomer composition comprising an ultraviolet absorptive monomer of the following formula (3) or (4):

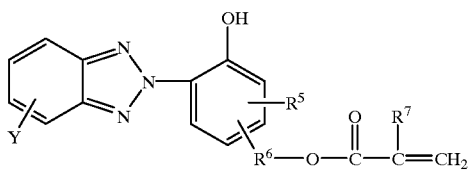

(3)

wherein $R^5$ is a hydrogen atom or a hydrocarbon group, $R^6$ is an alkylene group, $R^7$ is a hydrogen atom or a methyl group, and Y is a hydrogen atom, a halogen atom, a hydrocarbon group, an alkoxy group, a cyano group, or a nitro group;

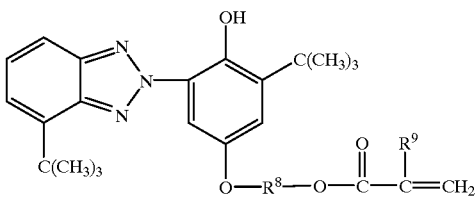

(4)

wherein $R^8$ is an alkylene group, and $R^9$ is a hydrogen atom or a methyl group.

The invented light resistance imparting polymer may also be a mixture of a polymer obtained by polymerizing a monomer composition including the ultraviolet stabilizable monomer and a polymer obtained by polymerizing a monomer composition including the ultraviolet absorptive monomer.

The invention is also related to a highly light resistant fiber containing the light resistance imparting polymer inside the fiber, and a highly light resistant fiber having a layer including the light resistance imparting polymer formed on its surface. In addition and advantageously, the invention is directed to a process for producing a highly light resistant fiber. This process includes the steps of blending the light resistance imparting polymer with a material for the production of a fiber, and spinning the resulting mixture.

DESCRIPTION OF THE PREFERRED EMBODIMENT

The invented light resistance imparting polymer for fibers is a polymer obtained by radical polymerizing a monomer composition comprising the ultraviolet stabilizable monomer of the formula (1) or (2) and/or the ultraviolet absorptive monomer of the formula (3) or (4), or is a mixture of a polymer obtained by radical polymerizing a monomer composition containing the ultraviolet stabilizable monomer, and a polymer obtained by radical polymerizing a monomer composition containing the ultraviolet absorptive monomer. The invented light resistance imparting polymer can therefore impart high light resistance to fibers. By blending the polymer with a material for the production of fibers prior to spinning and other fiber formation processes, the resulting formed fiber comprises a polymer chain having fiber-forming property (a polymer chain predominantly constitutes the fiber) entangled with a molecular chain of the light resistance imparting polymer on the molecular level. By this configuration, the bleedout and peeling off of the light resistance imparting polymer from the fiber surface and deterioration of appearance of the fiber can be significantly inhibited.

Particularly, the conventional low molecular weight light resistance improving agents are readily dropped out from fibers in humid surroundings, but the invented light resistance imparting polymer can impart light resistance to fibers over a long time even in humid surroundings. In addition, even when fibers are produced by wet spinning, the light resistance imparting polymer does not dissolve into a coagulation bath during spinning procedure. The invention will now be described in further detail below.

The invented light resistance imparting polymer is obtained by using a monomer composition essentially comprising a specific ultraviolet stabilizable monomer and/or ultraviolet absorptive monomer. The term "ultraviolet stabilizable monomer" means and includes monomers which do not belong to ultraviolet absorbents (UVAs) and do not have an ultraviolet absorbing property but stabilize a polymer satisfactorily against ultraviolet rays by a different activity or mechanism from UVAs and are radical polymerizable. The stabilizing activity against ultraviolet rays has not yet been sufficiently clarified, but this is probably because N-oxy radicals, which are formed by the oxidation of an N-substituent on a piperidine skeleton, trap alkyl radicals induced by ultraviolet rays.

The specific ultraviolet stabilizable monomers for use in the invention include piperidines of the formula (1) or (2). Illustrative substituents $R^4$ is a hydrogen atom or hydrocarbon groups each having 1 to 18 carbon atoms. Such hydrocarbon groups include, but are not limited to, methyl group, ethyl group, propyl group, isopropyl group, butyl group, isobutyl group, tert-butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, and other aliphatic hydrocarbon groups; cyclopropyl group, cyclopentyl group, cyclohexyl group, cycloheptyl group, cyclooctyl group, and other alicyclic hydrocarbon groups; phenyl group, tolyl group, xylyl group, benzyl group, phenethyl group, and other aromatic hydrocarbon groups.

Illustrative ultraviolet stabilizable monomers of the formula (1) include

- 4-(meth)acryloyloxy-2,2,6,6-tetramethylpiperidine,
- 4-(meth)acryloylamino-2,2,6,6-tetramethylpiperidine,
- 4-(meth)acryloyloxy-1,2,2,6,6-pentamethylpiperidine,
- 4-(meth)acryloylamino-1,2,2,6,6-pentamethylpiperidine,
- 4-cyano-4-(meth)acryloylamino-2,2,6,6-tetramethylpiperidine,
- 4-crotonoyloxy-2,2,6,6-tetramethylpiperidine, and
- 4-crotonoylamino-2,2,6,6-tetramethylpiperidine.

Each of these monomers can be used alone or in combination. Ultraviolet stabilizable monomers of the formula (1) are not limited to these compounds.

Examples of ultraviolet stabilizable monomers of the formula (2) include

- 1-(meth)acryloyl-4-(meth)acryloylamino-2,2,6,6-tetramethyl piperidine,
- 1-(meth)acryloyl-4-cyano-4-(meth)acryloylamino-2,2,6,6-tet ramethylpiperidine, and
- 1-crotonoyl-4-crotonoyloxy-2,2,6,6-tetramethylpiperidine.

Each of these monomers can be used alone or in combination. Ultraviolet stabilizable monomers of the formula (2) are not limited to these compounds.

In the present invention, an ultraviolet absorptive monomer can be used as a constituent of the light resistance imparting polymer instead of, or together with, the ultraviolet stabilizable monomer. The term "ultraviolet absorptive monomer" as used herein means and includes monomers which can absorb ultraviolet rays and re-radiate its energy predominantly as harmless thermal energy and are radical polymerizable. Such ultraviolet absorptive monomers for use in the invention are benzotriazoles of the formula (3) or (4).

In the formula (3), the hydrocarbon group in $R^5$ or Y includes hydrocarbon groups each having 1 to 8 carbon atoms. Such hydrocarbon groups include, but are not limited to, methyl group, ethyl group, propyl group, isopropyl group, butyl group, isobutyl group, tert-butyl group, pentyl group, hexyl group, heptyl group, octyl group, and other linear chain hydrocarbon groups; cyclopropyl group, cyclopentyl group, cyclohexyl group, cycloheptyl group, cyclooctyl group, and other alicyclic hydrocarbon groups; phenyl group, tolyl group, xylyl group, benzyl group, phenethyl group, and other aromatic hydrocarbon groups.

The alkylene group in $R^6$ includes alkylene groups each having 1 to 6 carbon atoms. Such alkylene groups includes, but are not limited to, methylene group, ethylene group, propylene group, butylene group, pentylene group, hexylene group, and other linear chain alkylene groups; isopropylene group, isobutylene group, sec-butylene group, tert-butylene group, 2,2-dimethylbutylene group, 2,3-dimethylbutylene group, isopentylene group, neopentylene group, and other branched chain alkylene groups. The halogen atom in Y is fluorine, chlorine, bromine, or iodine atom. The alkoxy group in Y includes alkoxy groups each having 1 to 6 carbon atoms. Such alkoxy groups include, but are not limited to, methoxy group, ethoxy group, propoxy group, butoxy group, pentoxy group, and heptoxy group. The alkylene group in $R^8$ includes alkylene groups each having 2 or 3 carbon atoms, such as ethylene group, trimethylene group, and propylene group.

Illustrative ultraviolet absorptive monomers of the formula (3) include, but are not limited to, 2-[2'-hydroxy-5'-(methacryloyloxymethyl)phenyl]-2H-benzotr iazole, 2-[2'-hydroxy-5'-(methacryloyloxyethyl)phenyl]-2H-benzotri azole, 2-[2'-hydroxy-5'-(methacryloyloxypropyl) phenyl]-2H-benzotriazole, 2-[2'-hydroxy-5'-(methacryloyl oxyhexyl)phenyl]-2H-benzotriazole, 2-[2'-hydroxy-3'-tert-butyl-5'-(methacryloyloxyethyl) pheny 1]-2H-benzotriazole, 2-[2'-hydroxy-5'-tert-butyl-3'-(methacryloyloxyethyl) phenyl]-2H-benzotriazole, 2-[2'-hydroxy-5'-(methacryloyl oxyethyl)phenyl]-5-chloro-2H-benzotriazole, 2-[2'-hydroxy-5'-(methacryloyloxyethyl)phenyl]-5-methoxy-2 H-benzotriazole, 2-[2'-hydroxy-5'-(methacryloyloxyethyl) phenyl]-5-cyano-2H-benzotriazole, 2-[2'-hydroxy-5'-(methacryloyloxyethyl)phenyl]-5-tert-butyl-2H-benzotriazole, 2-[2'-hydroxy-5'-(methacryloyloxyethyl) phenyl]-5-nitro-2H-benzotriazole, and the like.

Each of these ultraviolet absorptive monomers of the formula (3) can be used alone or in combination.

Examples of ultraviolet absorptive monomers of the formula (4) include, but are not limited to, 2-[2'-hydroxy-5'-(β-methacryloyloxyethoxy)-3'-tert-butylph enyl]-4-tert-butyl-2H-benzotriazole. Each of these ultraviolet absorptive monomers of the formula (4) can be used alone or in combination.

The invented light resistance imparting polymer may be a polymer composed of either the specific ultraviolet stabilizable monomer alone or the specific ultraviolet absorptive monomer alone. To impart a satisfactory light resistance to fibers, the polymer is preferably composed of the both monomers as a portion or the whole of its components. Each of the ultraviolet stabilizable monomer and the ultraviolet absorptive monomer mentioned herein is not limited to a single species, as stated above. That is, the invented light resistance imparting polymer may be preferably obtained by polymerizing a monomer composition including both the ultraviolet stabilizable monomer and the ultraviolet absorptive monomer.

The monomer composition preferably further includes a (meth)acrylate of the following formula (5):

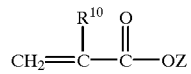

(5)

wherein $R^{10}$ is a hydrogen atom or a methyl group, and Z is a hydrocarbon group having 4 or more carbon atoms.

The use of the (meth)acrylic ester monomer of the formula (5) is preferred to improve the affinity of the resulting polymer with polyurethane fibers, acrylic fibers and other fibers. In the formula (5), the hydrocarbon group in Z includes hydrocarbon groups each having 4 or more carbon atoms. Such hydrocarbon groups include, but are not limited to, cyclohexyl group, methylcyclohexyl group, cyclododecyl group, and other alicyclic groups each having 4 or more carbon atoms; butyl group, isobutyl group, tert-butyl group, 2-ethylhexyl group, heptyl group, octyl group, nonyl group, decyl group, undecyl group, dodecyl group, pentadecyl group, octadecyl group, and other linear or branched chain alkyl groups each having 4 or more carbon atoms; bornyl group, isobornyl group, and other polycyclic hydrocarbon groups each having 4 or more carbon atoms. Of these groups, alicyclic hydrocarbon groups, branched chain alkyl groups, and linear chain alkyl groups each having 6 or more carbon atoms are desirable to further improve the light resistance and compatibility of polyurethane, acrylic polymer and other polymers.

Illustrative (meth)acrylates of the formula (5) include, but are not limited to, cyclohexyl(meth)acrylate, methyl cyclohexyl(meth)acrylate, cyclododecyl(meth)acrylate, tert-butylcyclohexyl(meth)acrylate, isobutyl(meth)acrylate, tert-butyl(meth)acrylate, lauryl(meth)acrylate, isobornyl (meth)acrylate, stearyl(meth)acrylate, and 2-ethylhexyl (meth) acrylate. Each of these compounds can be used alone or in combination.

The invented polymer may be prepared from an additional monomer as a copolymerizable component in addition to the monomers mentioned above. Any monomer can be used as the additional monomer as far as not deteriorating the advantages of the invention, i.e., imparting light resistance to fibers. Such additional monomers include, but are not limited to, (meth)acrylic acid, crotonic acid, itaconic acid, maleic acid, maleic anhydride, and other carboxyl group-containing unsaturated monomers; 2-(meth)acryloyloxyethyl acid phosphate, 2-(meth)acryloyloxypropyl acid phosphate, 2-(meth)acryloyloxy-3-chloropropyl acid phosphate, 2-methacryloyloxyethylphenyl phosphate, and other acid phosphate unsaturated monomers; hydroxyethyl (meth)acrylate, hydroxypropyl (meth)acrylate, caprolactone-modified hydroxy(meth)acrylates (e.g., trade name "PLACCEL FM", a product of Daicel Chemical Industries, Ltd., Japan), mono(meth)acrylate of polyester diols prepared from phthalic acid and propylene glycol, and other hydroxyl group-containing unsaturated monomers; methyl(meth)acrylate, ethyl(meth)acrylate, propyl(meth)acrylate, isopropyl (meth)acrylate, and other $C^1$–$C_6$ alkyl esters of (meth)acrylic acid; glycidyl(meth)acrylate, and other epoxy group-containing unsaturated monomers; (meth)acrylamide, N,N'-dimethylaminoethyl(meth)acrylate, vinylpyridine, vinylimidazole, and other nitrogen-containing unsaturated monomers; vinyl chloride, vinylidene chloride, and other halogen-containing unsaturated monomers; styrene, a-methylstyrene, vinyltoluene, and other aromatic unsaturated monomers; vinyl acetate, and other vinyl esters; vinyl ethers; trifluoroethyl(meth)acrylate, 2,2,3,3- tetrafluoropropyl (meth)acrylate, and other perfluoroalkyl group-containing unsaturated monomers; vinyltrimethoxysilane, vinyltriethoxy silane, γ-(meth) acryloyloxypropyltrimethoxysilane, γ-(meth) acryloyloxypropyldimethyl dimethoxysilane, vinyltriacetoxysilane, vinyltrichlorosilane, and other silicon-containing unsaturated monomers. Each of these monomers can be used alone or in combination according to necessity. Preferred additional monomers are (meth) acrylates.

The amount of each of the monomer constituents is not restricted. The total amount of the ultraviolet stabilizable monomers of the formula (1) or (2) is 0 to 100% by weight relative to the total weight of monomer composition for constituting the polymer. Naturally, when the amount of the ultraviolet stabilizable monomer is 0% by weight, the ultraviolet absorptive monomer should be essentially used. The polymer should essentially comprise either of these monomers to impart light resistance to fibers. The amount of the ultraviolet stabilizable monomer preferably has a lower limit of 5% by weight. The lower limit is more preferably 10% by weight, and most preferably 20% by weight. Large amounts of the ultraviolet stabilizable monomer will effectively impart light resistance to fibers. The amount of the ultraviolet stabilizable monomer preferably has an upper limit of 90% by weight. The upper limit is more preferably 80% by weight, and most preferably 70% by weight. Excessively large amounts of the ultraviolet stabilizable monomer may deteriorate compatibility of the polymer with a resin constituent of the fiber.

The total amount of the ultraviolet absorptive monomers of the formula (3) or (4) is 0 to 100% by weight relative to the total weight of monomer composition for constituting the polymer. As is in the ultraviolet stabilizable monomer, when the amount of the ultraviolet absorptive monomer is 0% by weight, the ultraviolet stabilizable monomer should be essentially used to effectively impart light resistance to fibers. A lower limit of the amount of the ultraviolet absorptive monomer preferably is 5% by weight, more preferably 10% by weight. Large amounts of the ultraviolet absorptive monomer will effectively impart light resistance to fibers. The amount of the ultraviolet absorptive monomer preferably has an upper limit of 95% by weight. The upper limit is more preferably 80% by weight.

In a preferred embodiment of the invention, the ultraviolet stabilizable monomer and the ultraviolet absorptive monomer are used in combination to obtain the invented polymer. The total amount of the both monomers is preferably 5% by weight or more relative to the amount of the monomer composition. A total amount of the both monomers less than 5% by weight cannot satisfactorily impart light resistance to fibers. The proportions of the (meth)acrylate of the formula (5) and other additional monomers may be appropriately changed according to the type and application of the fiber.

In addition to the above embodiment of the copolymerization of the ultraviolet stabilizable monomer and the ultraviolet absorptive monomer, the invented light resistance imparting polymer may be blended polymer obtained by blending a polymer obtained from a monomer composition containing the ultraviolet stabilizable monomer with a polymer obtained from a monomer composition containing the ultraviolet absorptive monomer. In this case, similar light resistance can be imparted to fibers as in the copolymer of the ultraviolet stabilizable monomer and the ultraviolet absorptive monomer, by blending the polymer contributing to high stability against ultraviolet rays with the polymer having an ultraviolet absorbing property.

The invented light resistance imparting polymer can be prepared by polymerizing a monomer composition containing the above-mentioned monomers according to a known radical polymerization process. Such polymerization processes include solution polymerization, dispersion polymerization, suspension polymerization, emulsion polymerization, and other polymerization processes. When the monomer composition is polymerized through solution polymerization, a solvent is used. Such solvents include, but are not limited to, toluene, xylene, and other aromatic solvents having high boiling point ; butyl acetate, ethyl acetate, cellosolve acetate, and other ester series solvents; acetone, methyl ethyl ketone, methyl isobutyl ketone, and other ketone series solvents; dimethylacetamide, dimethylformamide, and other amide series solvents. Solvent is not limited to these solvents, other solvents can be used. Each of these solvents can be used alone or in combination. The proportion of the solvent can be selected within an appropriate range in consideration of the concentration of a polymerized product and other parameters.

Polymerization initiators for use in the polymerization processes include, but are not limited to, conventional or known radical polymerization initiators such as 2,2'-azobis-(2-methylbutyronitrile), tert-butylperoxy-2-ethylhexanoate, 2,2'-azobisisobutyronitrile, benzoyl peroxide, and di-tert-butyl peroxide.

The proportion of the polymerization initiator is not limited and may be selected within an appropriate range in consideration of required characteristics of the polymer.

The reaction temperature is not critical, but is preferably in a range from room temperature to 200° C., and more preferably in a range from 40° C. to 140° C. The reaction time may be appropriately selected to complete the polymerization reaction according to the composition of the monomer components and the type of the polymerization initiator used. The polymer preferably has a number average molecular weight of 1000 or more. A polymer having a number average molecular weight less than 1000 will require a complicated polymerization technique to control the molecular weight. Such a polymer will have no difference in performances from conventional low molecular weight light resistance improving agents of additive type, and will cause bleedout or other disadvantages. In contrast, preferred upper limit of the number average molecular weight is $50\times10^4$. A polymer having a number average molecular weight exceeding $50\times10^4$ will require a complicated production operation, will be difficult to handle, and will have a deteriorated compatibility with a polymer for the formation of fibers. The number average molecular weight of the polymer is more preferably $10\times10^4$ or less, and most preferably $5\times10^4$ or less.

The invented light resistance imparting polymer can be used alone, can be used as a solution in a solvent, or can be mixed wi th another polymer, in the manner described below. Any known additive for fibers, such as an antistatic agent and flame retardant can be employed in addition to the polymer and solvent.

Processes for imparting light resistance to fibers by the use of the invented light resistance imparting polymer include two processes, i.e., a process of incorporating the light resistance imparting polymer into a fiber, and a process of forming a layer containing the light resistance imparting polymer on the surface of a fiber. Naturally, both processes can be employed in combination.

The process of incorporating the light resistance imparting polymer into a fiber comprises the step of mixing the light resistance imparting polymer into a material for the preparation of fibers prior to spinning, and the step of spinning the resulting mixture through a known spinning technique. Such spinning techniques include, for example, solution spinning, melt spinning, wet spinning, non-woven spinning, and gel spinning. The invented highly light resistant fiber can be obtained. The light resistance imparting polymer is free from volatility as compared with conventional low molecular weight light resistance improving agents of additive type, and the spinning operation can be performed at higher temperatures to improve the efficiency of spinning.

The proportion of the light resistance imparting polymer in the highly light resistant fiber, preferably is in a range of 0.1 to 20% by weight. A proportion of the polymer in the fiber less than 0.1% by weight will fail to impart satisfactory light resistance to the fiber, and in contrast, a proportion of the polymer exceeding 20% by weight will deteriorate the strength and other properties of the fiber. More preferable lower limit of the proportion is 0.5% by weight, and most preferable lower limit is 1.0% by weight. More preferable upper limit of the proportion is 15% by weight, and most preferable upper limit is 10% by weight.

According to the process of forming a layer containing the light resistance imparting polymer on the surface of a fiber, the surface layer may be formed by dipping the fiber previously formed in the polymer (or the aforementioned solution or mixture), or by coating to the surface of the fiber with the polymer (or the aforementioned solution or mixture). This process requires no spinning operation, and is capable of imparting light resistance to natural fibers. When a layer containing the light resistance imparting polymer is formed, a layer composed of the light resistance imparting polymer alone can be formed by appropriately selecting the copolymerization composition of the light resistance imparting polymer. Alternatively, the surface layer can be formed by mixing the light resistance imparting polymer with a binder composed of a known polymer (resin), and forming a layer from the resulting mixture in the fiber surface. The type of the binder resin is not critical, and the resin different from the material of the fiber may be employed. However, to improve adhesion, a similar type of resin to the material of the fiber is effectively employed. Specifically, a polyurethane resin for a polyurethane fiber, an acrylic resin for an acrylic fiber, and a polyester resin for a polyester fiber can be advantageously used as the binder. The proportion of the light resistance imparting polymer in the surface layer is preferably the same range as in the incorporation of the polymer in the fiber. The binder may further contain known additives.

Fibrous materials for the invented fiber include, but are not limited to, cotton, hemp, silk, animal hair, and other natural fibers; cellulose fibers, protein fibers, and other regenerated fibers and semi-synthetic fibers; polyurethane fibers, polyester fibers, acrylic fibers, nylon fibers (polyamide fibers), polyolefin fibers, polyvinylchloride fibers, polyvinylidene chloride fibers, polyvinyl alcohol fibers, and other synthetic fibers. Among them, the application of the invention to polyurethanes which have a low light resistance can highly effectively improve the light resistance of the resulting polyurethane fibers, and can provide versatile use of the polyurethane fibers. The application to widely employed polyester fibers and acrylic fibers is also preferable to impart higher light resistance to fibers.

The invented highly light resistant fibers can be advantageously used for any application of fibers, such as clothing, interior members of cars, and industrial materials. Particularly, the invented fibers have a significantly improved light resistance and are useful as fibrous materials for use outdoors.

As thus described, the application of the light resistance imparting polymer to fibers, which polymer is obtained by radical polymerizing a monomer composition containing the ultraviolet stabilizable monomer and/or ultraviolet absorptive monomer each having a specific structure can impart high light resistance and weather resistance to fibers over a long time.

The present invention will now be illustrated in more detail with reference to several invented examples and comparative examples below, which are not intended to limit the scope of the invention. All parts and percentages in the invented examples and comparative examples are by weight, unless otherwise specified.

EXAMPLE 1

[Polymerization of Light Resistance Imparting Polymer]

Into a 500-ml flask with a stirrer, a dropping inlet, a thermometer, a condenser tube, and a nitrogen gas inlet, 30 g of N,N-dimethylformamide (DMF) as a polymerization solvent, and 10 g of 2-[2'-hydroxy-5'-(methacryloyloxyethyl)phenyl]-2H-benzotriazole (UVA-1) were placed. A nitrogen gas was supplied into the flask, and the mixture in the flask was heated to 120° C. with stirring. A mixture of 10 g of UVA-1, 60 g of 4-methacryloyloxy-2,2,6,6-tetramethylpiperidine (HALS-1), 20 g of cyclohexylmethacrylate (CHMA), 70 g of DMF, and 2 g of 2,2'-azobis-(2-methylbutyronitrile) as a polymerization initiator was added dropwise to the mixture over 3 hours, and the resulting mixture was further heated for 4 hours after the completion of addition. A 50% polymer solution in DMF (this 50% DMF solution is hereinafter referred to as "light resistance imparting polymer 1") was obtained. The obtained polymer had a number average molecular weight of 5700.

EXAMPLES 2 TO 8

Each of light resistance imparting polymers 2 to 8 was prepared in the same manner as in Example 1, by employing a composition indicated in Table 1.

Abbreviations in the table have the following meanings.

HALS-1: 4-methacryloyloxy-2,2,6,6-tetramethylpiperidine
HALS-2: 1-methacryloyl-4-methacryloylamino-2,2,6,6-tetramethylpiperidine
UVA-1: 2-[2'-hydroxy-5'-(methacryloyloxyethyl)phenyl]-2H-benzotriazole
UVA-2: 2-[2'-hydroxy-5'-(β-methacryloyloxyethoxy)-3'-tert-butylph enyl]-4-tert-butyl-2H-benzotriazole
CHMA: cyclohexyl methacrylate
n-BMA: butyl methacrylate
BA: butyl acrylate
MMA: methyl methacrylate
HEMA: 2-hydroxyethyl methacrylate
MAA: methacrylic acid
DMF: N,N-dimethylformamide
Initiator: 2,2'-azobis-(2-methylbutyronitrile)

TABLE 1

| | | Example | | | | | | | |
|---|---|---|---|---|---|---|---|---|---|
| | | 1 | 2 | 3 | 4 | 5 | 6 | 7 | 8 |
| Initially Charged | UVA-1 | 10 | | | | 20 | 40 | | 10 |
| | UVA-2 | | | 20 | | | | 10 | |
| | DMF | 30 | 30 | 30 | 30 | 30 | 30 | 30 | |
| | Toluene | | | | | | | | 30 |
| Added Dropwise | UVA-1 | 10 | | | | | 20 | | 10 |
| | UVA-2 | | | | 5 | | | | |
| | HALS-1 | 60 | 60 | 20 | | 45 | | | 60 |
| | HALS-2 | | | | 5 | | | 10 | |
| | CHMA | 20 | 30 | 60 | | 30 | 30 | 20 | 20 |
| | n-BMA | | | | 60 | | | 20 | |
| | BA | | | 10 | | | 10 | 20 | |
| | MMA | | | | 30 | | | 17 | |
| | HEMA | | | | | 5 | | | |
| | MAA | | | | | | | 3 | |
| | Initiator | 4 | 4 | 4 | 4 | 4 | 4 | 5 | 4 |
| | DMF | 70 | 70 | 70 | 70 | 70 | 70 | 70 | |
| | Toluene | | | | | | | | 70 |
| Non-volatile Content (wt %) | | 50 | 49.9 | 50 | 50.1 | 50.2 | 50.1 | 50.3 | 50.1 |
| Number Average Molecular Weight | | 5700 | 5900 | 7500 | 5400 | 5800 | 6400 | 7200 | 6000 |

EXAMPLE 9

A polyester diol was prepared from 1,4-butanediol and adipic acid, and was mixed with 4,4'-diphenylmethane diisocyanate and 1,4-butanediol in a molar ratio of 1:4.2:3. The resulting mixture heated at 80° C. and another portion of 4,4'-diphenylmethane diisocyanate heated and molten at 50° C. were respectively continuously fed to a biaxial extruder by a fixed delivery pump to perform continuous melt polymerization of polyurethane. On the way in a cylinder of the extruder, 2% by weight (on solid basis) of the light resistance imparting polymer 1 (50% solution in DMF) prepared in Example 1 was added relative to the polyurethane. The prepared polyurethane was extruded into water. Then the polyurethane was cut to yield polyurethane pellets containing the light resistance imparting polymer 1. The prepared pellets were dehumidified and dried at 80° C. for 20 hours, and were fed to a spinning machine with a uniaxial extruder and spun at a temperature of 225° C. at a spinning rate of 500 m/min. Polyurethane fiber containing the light resistance imparting polymer 1 was obtained.

EXAMPLES 10 TO 15

Polyurethane fibers containing any of the light resistance imparting polymers 2 to 7 prepared in Examples 2 to 7 were obtained in the same manner as in Example 9.

EXAMPLE 16

Polyurethane fiber containing the polymer 2 (2% on the basis of solid content relative to the polyurethane fiber) prepared in Example 2 and the polymer 6 (0.7% on the basis of solid content relative to the polyurethane fiber) prepared in Example 6 was obtained in a similar manner as in Example 9.

COMPARATIVE EXAMPLE 1

Comparative polyurethane fiber containing no light resistance imparting polymer was prepared by performing continuous melt polymerization, pellet preparation and spinning procedures in the same manner as in Example 9, except that no light resistance imparting polymer was added to a material in the preparation of polyurethane.

COMPARATIVE EXAMPLE 2

Comparative polyurethane fiber containing a total of 1.5% of low molecular weight light resistance improving agents was prepared by performing continuous melt polymerization, pellet preparation and spinning procedures in the same manner as in Example 9. In the preparation of polyurethane, 1.0% (relative to polyurethane) of a low molecular weight hindered amine type light stabilizer (molecular weight: 481; trade name "MARK LA-77", a product of ADEKA ARGUS CHEMICAL CO., Ltd.) and 0.5% (relative to polyurethane) of a low molecular weight benzotriazole series ultraviolet absorbent (molecular weight: 447.6; trade name "TINUVIN 234", a product of Ciba Specialty Chemicals K.K.) were added instead of the light resistance imparting polymer.

EXAMPLES 17 TO 23

To a mixture of 1000 g of polytetramethylene ether glycol having a molecular weight of 1950 and 4 g of 1,4-butanediol, 250 g of 4,4'-diphenylmethane diisocyanate was added, and the resulting mixture was subjected to polymerization at 85° C. for 60 minutes to yield a prepolymer. The prepolymer was dissolved in 900 g of DMF and the resulting solution was cooled to 5° C. To the cooled solution, a DMF solution containing 13.0 g of ethylenediamine, 9.64 g of 1,2-propylenediamine, and 4.95 g of 1,2-cyclohexanediamine was added. To the resulting polymer, a DMF solution containing 5.29 g of monoethanolamine was added, and subsequently a solution of 5 g of acetic anhydride in 250 g of DMF was added. A material for the production of polyurethane fiber was obtained.

To the above-prepared material, 2% (on solid basis relative to the polyurethane) of the light resistance imparting polymer 1 (50% solution in DMF) prepared in Example 1 was added. The material containing the light resistance imparting polymer 1 was extruded through spinnerets into a 55% DMF aqueous solution and was drawn six times in a boiling water, and was subjected to a drying operation in a hot air at 90° C. and to a setting operation in a steam at 105° C. . Polyurethane fiber was obtained. Likewise, polyurethane fibers each containing any of the light resistance imparting polymers 2 to 7 prepared in Examples 2 to 7 were obtained.

EXAMPLE 24

Polyurethane fiber containing the polymer 2 (2% on the basis of solid content relative to the polyurethane fiber) prepared in Example 2 and the polymer 6 (0.7% on the basis of solid content relative to the polyurethane fiber) prepared in Example 6 was obtained in a similar manner as in Example 17.

COMPARATIVE EXAMPLE 3

Comparative polyurethane fiber containing no light resistance imparting polymer was prepared in the same manner as in Example 17, except that no light resistance imparting polymer was added.

COMPARATIVE EXAMPLE 4

Comparative polyurethane fiber containing a total of 1.5% of low molecular weight light resistance improving agents was prepared by wet spinning in the same manner as in Example 17, except that 1.0% (relative to the polyurethane) of the hindered amine type light stabilizer and 0.5% (relative to the polyurethane) of the benzotriazole series ultraviolet absorbent were added to the material for the production of polyurethane fiber instead of the light resistance imparting polymer.

EXAMPLE 25

A polyurethane fiber was prepared in the same manner as in Example 17, except that the light resistance imparting polymer 1 was not added. The prepared polyurethane fiber was dipped in a mixture solution of 100 parts of the light resistance imparting polymer 8 prepared in Example 8 and 50 parts of toluene for 3 minutes. The dipped fiber was then heated at 110° C. for 30 minutes. Polyurethane fiber having a layer containing the light resistance imparting polymer alone formed on its surface was obtained.

COMPARATIVE EXAMPLE 5

Polyurethane fiber was prepared in the same manner as in Example 17, except that the light resistance imparting polymer 1 was not added. Separately, to a water-soluble polyurethane resin (trade name "ELASTRON F-29", a product of Daiichi Kogyo Seiyaku Co., Ltd., Japan), 10% (relative to the water-soluble polyurethane) of the aforementioned hindered amine type light stabilizer and 5% (relative to the water-soluble polyurethane) of the benzotriazole series ultraviolet absorbent were added to yield a resin solution. The above-prepared polyurethane fiber was dipped in the resin solution, and the dipped fiber was heated at 140° C. for 20 minutes. Comparative polyurethane fiber having a resin layer containing the low molecular weight light resistance improving agents formed on its surface was obtained.

EXAMPLES 26 TO 28

An acrylic copolymer was synthesized from 95 parts of acrylonitrile and 5 parts of methacrylic acid, and was dissolved in DMF to yield a material for the production of acrylic fiber containing the acrylic copolymer in a concentration of 25%. To this material, the light resistance imparting polymer 1 (50% solution in DMF) prepared in example 1 was added in a proportion of 2% on solid basis relative to the acrylic copolymer. The material containing the light resistance imparting polymer 1 was extruded through spinnerets into a 55% DMF aqueous solution and was drawn eight times in a boiling water, and was subjected to a drying operation in a hot air at 90° C. and to a setting operation in a steam at 105° C. Acrylic fiber was obtained. Likewise, acrylic fibers each containing any of the light resistance imparting polymers 2 and 3 prepared in Examples 2 and 3 were obtained.

COMPARATIVE EXAMPLE 6

Comparative acrylic fiber containing no light resistance imparting polymer was prepared in the same manner as in Example 26, except that the light resistance imparting polymer 1 was not added.

COMPARATIVE EXAMPLE 7

Comparative acrylic fiber containing a total of 1.5% of low molecular weight light resistance improving agents was prepared by wet spinning in the same manner as in Example 26, except that 1.0% (relative to the acrylic copolymer) of the hindered amine type light stabilizer and 0.5% (relative to the acrylic copolymer) of the benzotriazole series ultraviolet absorbent were added to the material for the production of acrylic fiber, instead of the light resistance imparting polymer.

[Evaluation Methods]

1. Durability Test

A 5-cm sample was prepared from each of the above prepared fibers, and was extended at tensile speed of 50cm/min to 300% as long as original length (5-cm) using a tensile tester ("INSTRON 4502 TYPE"). Then, the extended sample was released. The extending and releasing procedures were repeated five times each. In the sixth extending procedure, the sample was extended until it was broken, and the breaking extension and breaking strength of the sample were measured as initial values. Separately, another 5-cm sample was irradiated with ultraviolet rays(UV) for 20 hours using a Sunshine Weather Meter, an accelerated weathering tester. The breaking extension and breaking strength of this sample after UV irradiation were determined. The extension retention ratio and strength retention ratio were respectively defined as the ratio of the value after UV irradiation to the initial value. Specifically, the retention ratio was calculated according to the following equation:

The retention ratio (%) =[Value after UV irradiation/ Initial value]×100

The results are shown in Tables 2 to 5. A similar test was performed on a sample after storage at 80° C. at 98% relative humidity (RH) for 30 hours (in the tables, indicated as "after humid storage"), and the results are set forth in Tables 2 and 5.

2. Yellowing Resistance Test

A sample was subjected to UV irradiation in 70° C. for 4 hours and was left in a humid atmosphere at 50° C. in a 4 hours, as a cycle. The cycle was repeated 12 times. Then the yellowing degree (Δb) of the sample after the 96 hours test was determined. The yellowing degree of the sample was calculated according to the following equation. The yellowing degree indicates a change from an initial yellowness.

Yellowing degree (Δb) =(Yellowness after Test)−(Initial Yellowness)

The results are shown in Tables 2 to 5. A similar test was performed on a sample after storage at 80° C. at 98% relative humidity (RH) for 30 hours (in the tables, indicated as "after humid storage"), and the results are set forth in Tables 2 and 5.

In the tables below, the term "polymer" means the light resistance imparting polymer, and the term "agent" means the low molecular weight light resistance improving agent.

TABLE 2

Polyurethane Fiber (Melt Spinning)

| | Example | | | | | | | | Comp. Ex. | |
|---|---|---|---|---|---|---|---|---|---|---|
| | 9 | 10 | 11 | 12 | 13 | 14 | 15 | 16 | 1 | 2 |
| Polymer No. | 1 | 2 | 3 | 4 | 5 | 6 | 7 | 2 & 6 | — | — |
| Amount of Polymer (wt %) | 2 | 2.5 | 4 | 8 | 2.5 | 3 | 8 | 2 + 0.7 | — | — |
| Amount of Agent (wt %) | — | — | — | — | — | — | — | — | — | 1.5 |
| Extention Retention Ratio (%) | 100 | 94 | 99 | 94 | 100 | 92 | 98 | 96 | 81 | 91 |
| Extention Retention Ratio After Humid Storage (%) | 98 | 91 | 97 | 94 | 99 | 90 | 97 | 95 | 78 | 83 |
| Strength Retention Ratio (%) | 95 | 85 | 92 | 88 | 94 | 84 | 94 | 90 | 36 | 76 |
| Strength Retention Ratio After Humid Storage (%) | 94 | 85 | 91 | 86 | 93 | 83 | 93 | 89 | 33 | 52 |
| Yellowing Resistance Δb | 3.9 | 3.9 | 4.0 | 4.5 | 3.8 | 4.1 | 4.0 | 4.0 | 21.3 | 5.9 |
| Yellowing Resistance After Humid Storage Δb | 4.1 | 4.2 | 4.3 | 5.0 | 4.0 | 4.3 | 4.3 | 4.3 | 21.3 | 14.5 |

TABLE 3

Polyurethane Fiber (Wet Spinning)

| | Example | | | | | | | | Comp. Ex. | |
|---|---|---|---|---|---|---|---|---|---|---|
| | 17 | 18 | 19 | 20 | 21 | 22 | 23 | 24 | 3 | 4 |
| Polymer No. | 1 | 2 | 3 | 4 | 5 | 6 | 7 | 2 & 6 | — | — |
| Amount of Polymer (wt %) | 2 | 2.5 | 4 | 8 | 2.5 | 3 | 8 | 2 + 0.7 | — | — |
| Amount of Agent (wt %) | — | — | — | — | — | — | — | — | — | 1.5 |
| Extention Retention Ratio (%) | 99 | 92 | 98 | 95 | 99 | 90 | 98 | 95 | 80 | 92 |
| Extention Retention Ratio After Humid Storage (%) | 98 | 91 | 97 | 94 | 98 | 89 | 97 | 93 | 78 | 86 |
| Strength Retention Ratio (%) | 93 | 83 | 93 | 87 | 94 | 83 | 94 | 88 | 34 | 73 |
| Strength Retention Ratio After Humid Storage (%) | 92 | 82 | 93 | 85 | 92 | 80 | 91 | 87 | 33 | 55 |
| Yellowing Resigtance Δb | 4.0 | 3.9 | 4.1 | 4.7 | 4.1 | 4.3 | 3.9 | 4.3 | 22.3 | 6.3 |
| Yellowing Resistance After Humid Storage Δb | 4.2 | 4.3 | 4.2 | 5.2 | 4.4 | 4.6 | 4.5 | 4.6 | 23.5 | 15.1 |

TABLE 4

Polyurethane Fiber: Surface Layer Type

| | Example 25 | Comp. Ex. 3 | Comp. Ex. 5 |
|---|---|---|---|
| Polymer No. | 8 | — | — |
| Extention Retention Ratio (%) | 90 | 80 | 84 |
| Extention Retention Ratio After Humid Storage (%) | 89 | 78 | 80 |
| Strength Retention Ratio (%) | 71 | 34 | 59 |
| Strength Retention Ratio After Humid Storage (%) | 69 | 33 | 39 |
| Yellowing Resistance Δb | 6.5 | 22.3 | 9.7 |
| Yellowing Resistance After Humid Storage Δb | 6.8 | 23.5 | 17.8 |

TABLE 5

Acrylic Fiber (Wet Spinning)

| | Example | | | Comp. Ex. | |
|---|---|---|---|---|---|
| | 26 | 27 | 28 | 6 | 7 |
| Polymer No. | 1 | 2 | 3 | — | — |
| Amount of Polymer (wt %) | 2 | 2.5 | 4 | — | — |
| Amount of Agent (wt %) | — | — | — | — | 1.5 |
| Extention Retention Ratio (%) | 100 | 91 | 99 | 86 | 95 |
| Extention Retention Ratio After Humid Storage (%) | 99 | 90 | 99 | 84 | 88 |
| Strength Retention Ratio (%) | 98 | 92 | 98 | 37 | 80 |
| Strength Retention Ratio After Humid Storage (%) | 96 | 88 | 95 | 35 | 60 |
| Yellowing Resistance Δb | 3.2 | 3.4 | 3.1 | 18.5 | 5.3 |
| Yellowing Resistance After Humid Storage Δb | 3.3 | 3.4 | 3.3 | 19.0 | 11.7 |

Tables 2 to 5 show that the fibers containing the light resistance imparting polymer or the fibers having a layer of the light resistance imparting polymer on its surface had further higher extension retention ratio, strength retention ratio and yellowing resistance after the accelerated weathering test than comparative examples each composed of a fiber alone. The fibers containing conventional low molecular weight light resistance improving agents according to the comparative examples exhibited significantly deteriorated extension retention ratio, strength retention ratio and yellowing resistance after storage in humid surroundings, but the invented fibers according to the invented examples showed slightly deteriorated properties. The invented polymers according to examples can satisfactorily impart light resistance to fibers as compared with the use of conventional light resistance improving agents.

Other embodiments and variations will be obvious to those skilled in the art, and this invention is not to be limited to the specific matters stated above.

What is claimed is:

1. A light-resistant fiber containing a polymer for imparting light resistance to the fiber, incorporated inside the fiber, said polymer being obtained by radical polymerizing a monomer composition comprising an ultraviolet stabilizable monomer of the following formula (1) or (2):

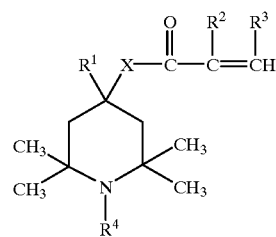 (1)

wherein $R^1$ is a hydrogen atom or a cyano group, each of $R^2$ and $R^3$ is independently a hydrogen atom or a methyl group, $R^4$ is a hydrogen atom or a hydrocarbon group, and X is an oxygen atom or an imino group,

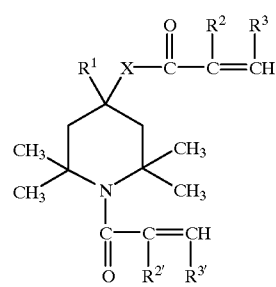 (2)

wherein $R^1$ is a hydrogen atom or a cyano group, each of $R^2$, $R^3$, $R^{2'}$, and $R^{3'}$ is independently a hydrogen atom or a methyl group, and X is an oxygen atom or an imino group.

2. A light-resistant fiber according to claim 1, wherein said monomer composition further comprises a (meth) acrylate of the following formula (5):

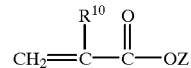 (5)

wherein $R^{10}$ is a hydrogen atom or a methyl group, and Z is a hydrocarbon group having 4 or more carbon atoms.

3. A light-resistant fiber containing a polymer for imparting light resistance to the fiber, incorporated inside the fiber, said polymer being obtained by radical polymerizing a monomer composition comprising an ultraviolet absorptive monomer of the following formula (3) or (4):

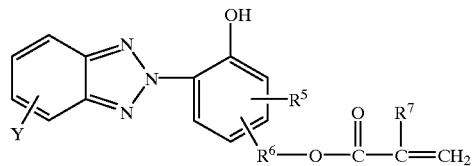 (3)

wherein $R^5$ is a hydrogen atom or a hydrocarbon group, $R^6$ is an alkylene group, $R^7$ is a hydrogen atom or a methyl group, and Y is a hydrogen atom, a halogen atom, a hydrocarbon group, an alkoxy group, a cyano group, or a nitro group

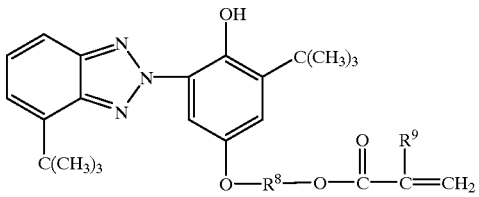 (4)

wherein $R^8$ is an alkylene group, and $R^9$ is a hydrogen atom or a methyl group.

4. A light-resistant fiber according to claim 3, wherein said monomer composition further comprises a (meth) acrylate of the following formula (5):

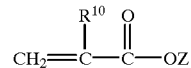 (5)

wherein $R^{10}$ is a hydrogen atom or a methyl group, and Z is a hydrocarbon group having 4 or more carbon atoms.

5. A light-resistant fiber containing a polymer for imparting light resistance to the fiber, incorporated inside the fiber, said polymer comprising (a) a polymer obtained by radical polymerizing a monomer composition comprising an ultraviolet stabilizable monomer of the following formula (1) or (2):

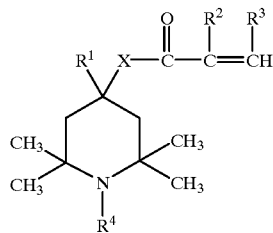
(1)

wherein $R^1$ is a hydrogen atom or a cyano group, each of $R^2$ and $R^3$ is independently a hydrogen atom or a methyl group, $R^4$ is a hydrogen atom or a hydrocarbon group, and X is an oxygen atom or an imino group,

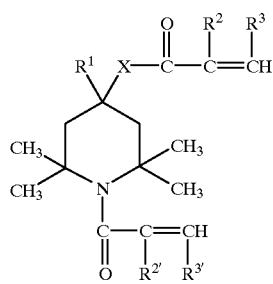
(2)

wherein $R^1$ is a hydrogen atom or a cyano group, each of $R^2$, $R^3$, $R^{2'}$, and $R^{3'}$ is independently a hydrogen atom or a methyl group, and X is an oxygen atom or an imino group, and (b) a polymer obtained by radical polymerizing a monomer composition comprising an ultraviolet absorptive monomer of the following formula (3) or (4):

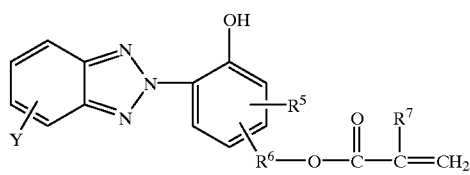
(3)

wherein $R^5$ is a hydrogen atom or a hydrocarbon group, $R^6$ is an alkylene group, $R^7$ is a hydrogen atom or a methyl group, and Y is a hydrogen atom, a halogen atom, a hydrocarbon group, an alkoxy group, a cyano group, or a nitro group;

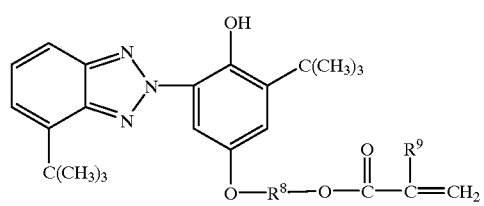
(4)

wherein $R^8$ is an alkylene group, and $R^9$ is a hydrogen atom or a methyl group.

6. A light-resistant fiber according to claim 5, wherein said monomer composition further comprises a (meth) acrylate of the following formula (5):

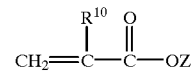
(5)

wherein $R^{10}$ is a hydrogen atom or a methyl group, and Z is a hydrocarbon group having 4 or more carbon atoms.

7. A light-resistant fiber containing a polymer for imparting light resistance to the fiber, incorporated inside the fiber, said polymer being obtained by radical polymerizing a monomer composition comprising (a) an ultraviolet stabilizable monomer of the following formula (1) or (2):

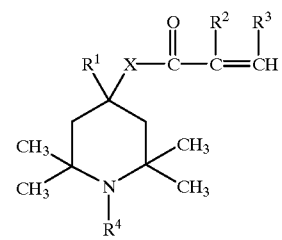
(1)

wherein $R^1$ is a hydrogen atom or a cyano group, each of $R^2$ and $R^3$ is independently a hydrogen atom or a methyl group, $R^4$ is a hydrogen atom or a hydrocarbon group, and X is an oxygen atom or an imino group,

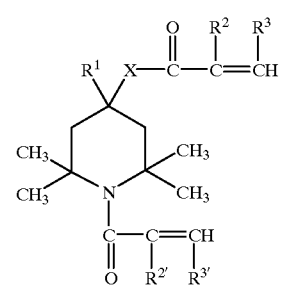
(2)

wherein $R^1$ is a hydrogen atom or a cyano group, each of $R^2$, $R^3$, $R^{2'}$, and $R^{3'}$ is independently a hydrogen atom or a methyl group, and X is an oxygen atom or an imino group, and (b) an ultraviolet absorptive monomer of the following formula (3) or (4):

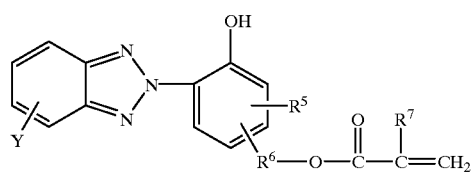
(3)

wherein $R^5$ is a hydrogen atom or a hydrocarbon group, $R^6$ is an alkylene group, $R^7$ is a hydrogen atom or a methyl group, and Y is a hydrogen atom, a halogen atom, a hydrocarbon group, an alkoxy group, a cyano group, or a nitro group;

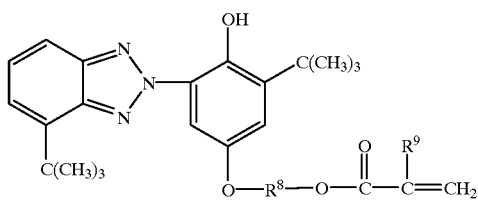

wherein $R^8$ is an alkylene group, and $R^9$ is a hydrogen atom or a methyl group.

8. A light-resistant fiber according to claim 7, wherein said monomer composition further comprises a (meth)acrylate of the following formula (5):

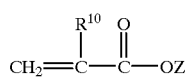

wherein $R^{10}$ is a hydrogen atom or a methyl group, and Z is a hydrocarbon group having 4 or more carbon atoms.

9. A light-resistant fiber having a layer comprising a polymer for imparting light resistance to the fiber, formed on its surface, said polymer being obtained by radical polymerizing a monomer composition comprising an ultraviolet absorptive monomer of the following formula (3) or (4):

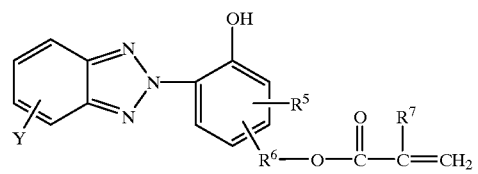

wherein $R^5$ is a hydrogen atom or a hydrocarbon group, $R^6$ is an alkylene group, $R^7$ is a hydrogen atom or a methyl group, and Y is a hydrogen atom, a halogen atom, a hydrocarbon group, an alkoxy group, a cyano group, or a nitro group;

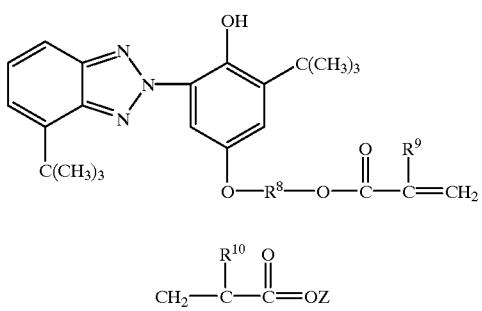

wherein $R^8$ is an alkylene group, and $R^9$ is a hydrogen atom or a methyl group.

10. A light-resistant fiber according to claim 9, wherein said monomer composition further comprises a (meth)acrylate of the following formula (5):

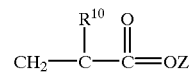

wherein $R^{10}$ is a hydrogen atom or a methyl group, and Z is a hydrocarbon group having 4 or more carbon atoms.

11. A light-resistant fiber having a layer comprising a polymer for imparting light resistance to the fiber, formed on its surface, said polymer being obtained by radical polymerizing a monomer composition comprising (a) an ultraviolet stabilizable monomer of the following formula (1) or (2):

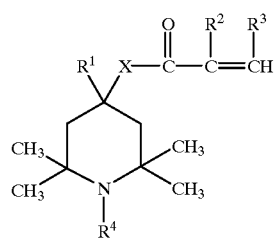

wherein $R^1$ is a hydrogen atom or a cyano group, each of $R^2$ and $R^3$ is independently a hydrogen atom or a methyl group, $R^4$ is a hydrogen atom or a hydrocarbon group, and X is an oxygen atom or an imino group,

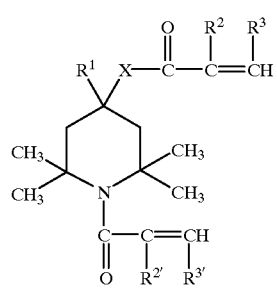

wherein $R^1$ is a hydrogen atom or a cyano group, each of $R^2$, $R^3$, $R^{2'}$, and $R^{3'}$ is independently a hydrogen atom or a methyl group, and X is an oxygen atom or an imino group, and (b) an ultraviolet absorptive monomer of the following formula (3) or (4):

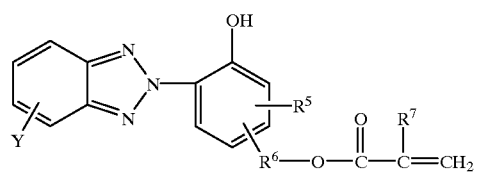

wherein $R^5$ is a hydrogen atom or a hydrocarbon group, $R^6$ is an alkylene group, $R^7$ is a hydrogen atom or a methyl group, and Y is a hydrogen atom, a halogen atom, a hydrocarbon group, an alkoxy group, a cyano group, or a nitro group;

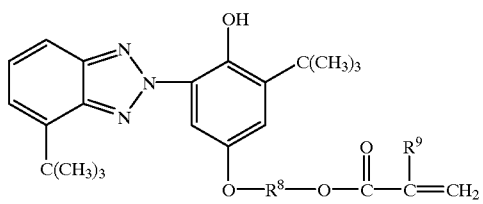
(4)
wherein $R^8$ is an alkylene group, and $R^9$ is a hydrogen atom or a methyl group.
12. A light-resistant fiber according to claim 11, wherein said monomer composition further comprises a (meth) acrylate of the following formula (5):
(5)
wherein $R^{10}$ is a hydrogen atom or a methyl group, and Z is a hydrocarbon group having 4 or more carbon atoms.
* * * * *